July 15, 1969 E. R. ZIEGLER 3,454,977
WINDSHIELD WASHER HAVING TWO DURATIONS OF LIQUID APPLICATION
Filed Nov. 25, 1966 2 Sheets-Sheet 1

INVENTOR.
Eugene R. Ziegler
BY
Donald P. Selucki
ATTORNEY

July 15, 1969     E. R. ZIEGLER     3,454,977
WINDSHIELD WASHER HAVING TWO DURATIONS OF LIQUID APPLICATION
Filed Nov. 25, 1966     2 Sheets-Sheet 2

INVENTOR.
Eugene R. Ziegler
BY
Donald P. Selwacki
ATTORNEY

United States Patent Office 3,454,977
Patented July 15, 1969

3,454,977
WINDSHIELD WASHER HAVING TWO DURATIONS OF LIQUID APPLICATION
Eugene R. Ziegler, Spencerport, N.Y., assignor to General Motors Corporation, Detroit, Mich., a corporation of Delaware
Filed Nov. 25, 1966, Ser. No. 596,890
Int. Cl. B60s 1/48; A47l 1/02
U.S. Cl. 15—250.02                4 Claims

ABSTRACT OF THE DISCLOSURE

In a preferred form, this disclosure relates to a windshield washer system for intermittently delivering squirts of washing fluid onto a windshield of an automotive vehicle. The washer system includes a washer pump having a reciprocable plunger means and a drive means having an interruptible driving connection with the plunger means. The washer system also includes a selectively operable control means for establishing a driving connection between the drive means and the plunger means to operate the pump automatically and which thereafter interrupts the driving connection therebetween to stop operation of the pump. The control means includes a first means operable to effect operation of the pump for a predetermined duration of time and a second means operatively connected with the first means and operable to effect operation of the pump for a lesser duration of time whereby different quantities of cleaning fluid can be squirted onto the windshield.

---

This invention relates to windshield washer systems, and more particularly, to a system which can select either of two cycles of operation.

Windshield washers of common design, for example the type shown in U.S. Patent 2,905,962, assigned to the assignee of the present invention, utilizes a toothed wheel having a given number of teeth which correspond to the number of cycles or squirts of water dispensed toward a windshield when a washing cycle is begun. There are times when it is desirable to dispense a lesser amount of liquid toward a windshield to be cleaned due to lack of accumulation on a windshield, for example. In the prior art only demand type systems are capable of having a varied quantity of water dispensed but at the expense of providing an automatic cycling.

It is an object of the present invention to provide a windshield washing system which normally functions as an automatic cycling system but which can selectively be made to operate for a shorter duration.

It is another object of the present invention to provide a combination automatic cycling system with a manually selectable cycle of shorter duration while not altering existing washing mechanisms drastically.

Further objects and advantages of the present invention will be apparent from the following description, reference being had to the accompanying drawings wherein a preferred embodiment of the present invention is clearly shown.

Figure 1:
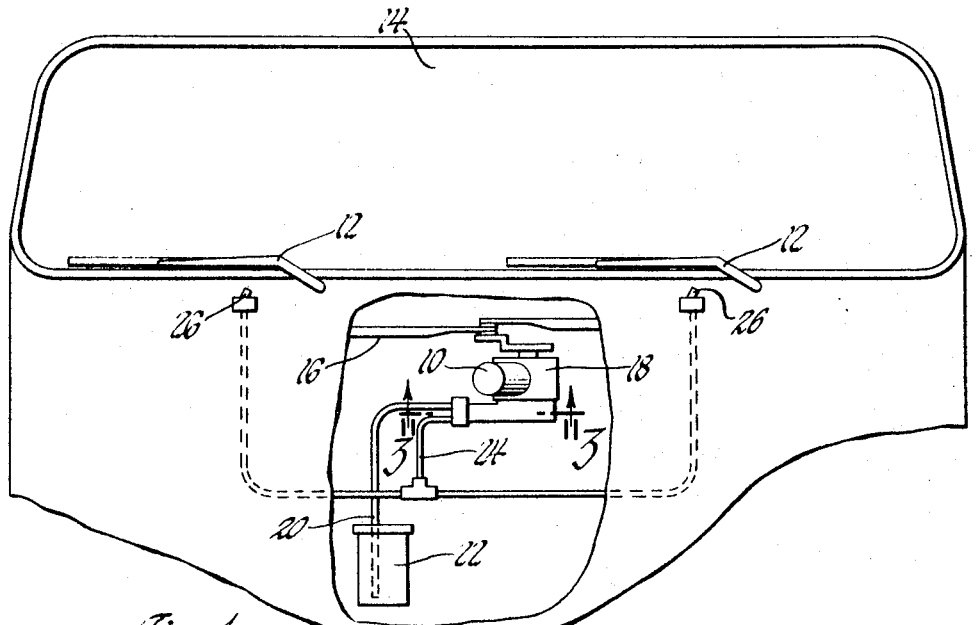
Figure 2:
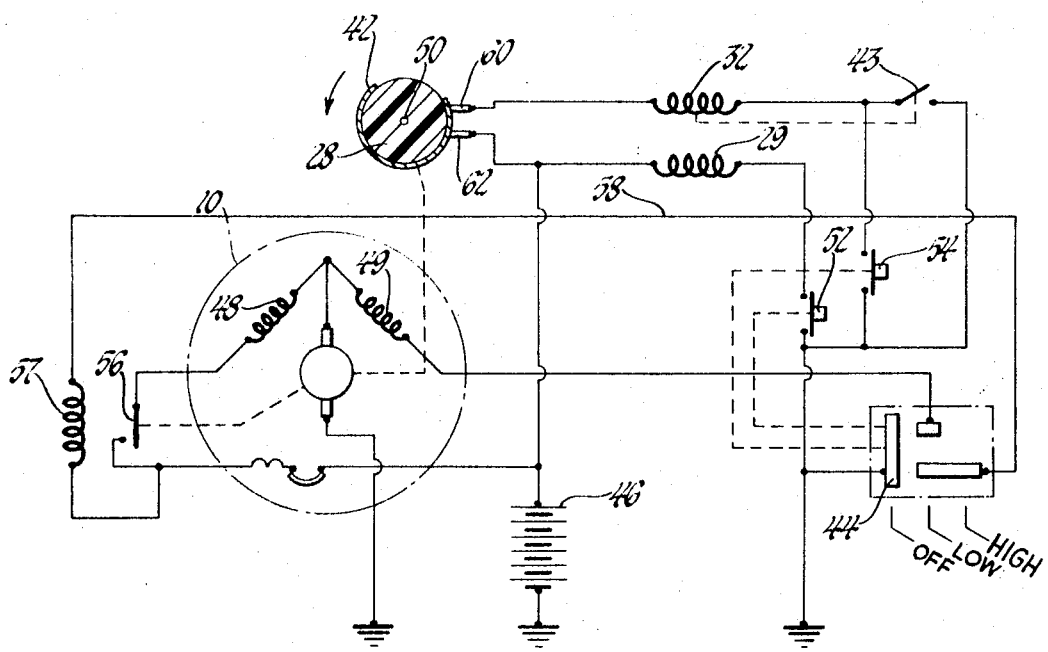
Figure 3:
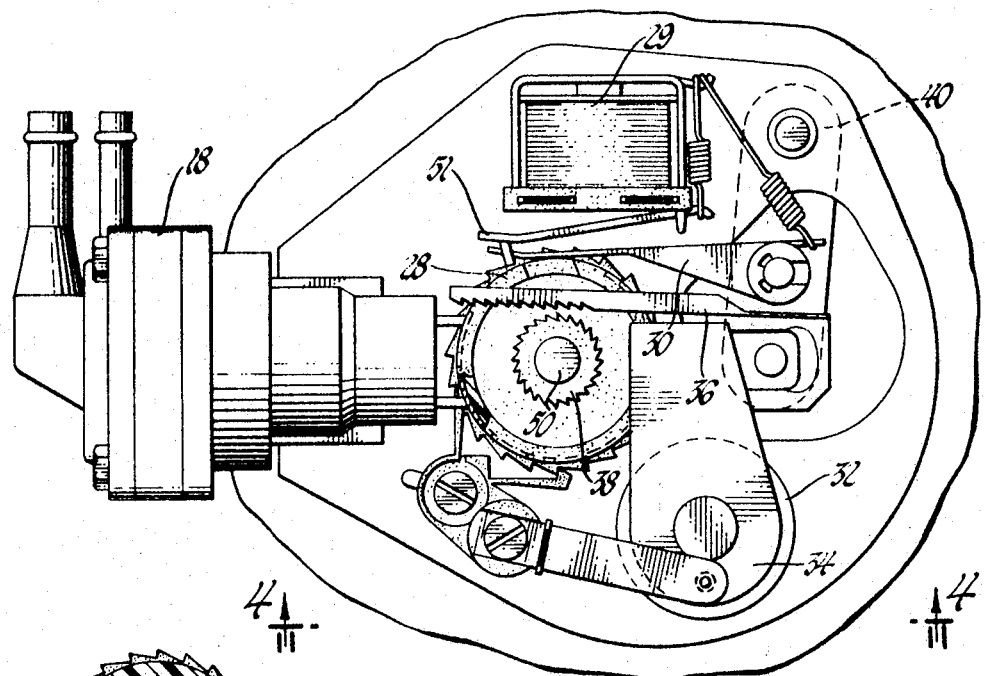
Figure 4:
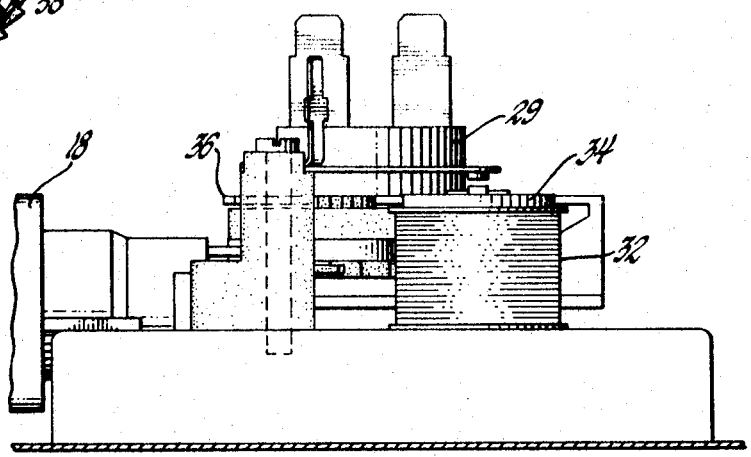

In the drawings:
FIGURE 1 is an elevational view of the front of the vehicle showing the subject invention in its operative environment.
FIGURE 2 is an electrical schematic of the present system.
FIGURE 3 is an elevational view taken along line 3—3 of FIGURE 1 showing the basic operative components for the invention.
FIGURE 4 is an elevational directional view looking in the direction of the arrow 4 of FIGURE 3.

Figure 5:
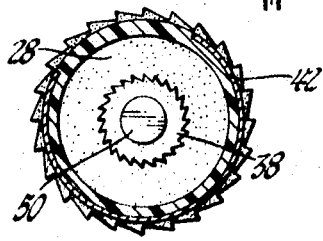

FIGURE 5 is a sectional view of the cycling counter.
Referring now to FIGURE 1, a windshield wiper motor 10 drives windshield wiper arms 12 across windshield 14 by means of drive linkage 16. Washer pump 18 is operatively connected to motor 10 so that water is drawn through line 20 from reservoir 22 into the pump 18 and dispensed through lines 24 to outlets 26 directed at windshield 14 when the pump is energized.

Referring now to FIGURE 3, the operation of pump 18 is the same as described in U.S. Patent 2,905,962, in which the number of teeth on a ratchet cam assembly therein determines the number of times water is dispensed from the washer pump and thereby controls the duration of the wash cycle.

Referring to FIGURE 3, the ratchet cam assembly 28 is driven by the drive pawl 30 in response to a momentary energization of coil 29 in a conventional manner when an ordinary cycle of the subject mechanism is desired. When a short cycle is selected, coil 32 is temporarily energized in a manner to be hereinafter described, magnetizing arm 34, which in turn draws a second drive pawl 36 toward a smaller diameter tooth wheel 38, carried on ratchet cam assembly 28. In this manner, upon each stroke of lever 40 generated in the manner described in U.S. Patent 2,905,962, drive pawl 36 will act as a rack against tooth wheel 38 to rotate ratchet cam assembly 28 a greater amount than if the rotation were restricted to the amount capable of being generated by drive pawl 30. The action of drive pawl 30 is thereby effectively overridden.

Referring to FIGURE 5, ratchet cam assembly 28 is more clearly seen as having a conductive surface element 42, and integrally formed with assembly 28 is the smaller tooth wheel 38.

Referring to FIGURE 2, a schematic illustration is shown in which a wiper motor on-off switch 44 is illustrated as being connected through motor windings 48 and 49 between the ground and battery 46. Ratchet cam assembly 28 is freely rotatable on shaft 50. A wash cycle is initiated by moving switch 44 to the low position, which movement is brought about the depressing either normal wash button 52 or abbreviated wash button 54 due to a mechanical interconnection therebetween and on-off switch 44.

To initiate a normal cycle, button 52 is depressed, momentarily energizing coil 29 to lift lock arm 51, allowing drive pawl 30 to engage assembly 28 and causing windings 48 and 49 of motor 10 to become energized as camming cam switch 56 is drawn to an on position by coil 57 through lead 58. Motor 10 will thereafter operate and one complete cycle of wash will occur depending on the number of teeth on ratchet cam assembly 28. When one complete revolution of rotatable cam assembly 28 has taken place, arm 51 will re-engage assembly 28, resulting in the washing cycle coming to a halt but allowing wiper motor 10 to continue to run until on-off switch 44 is manually opened.

When a more abbreviated wash cycle is desired, button 54 is depressed and, due to the interlock between button 54 and on-off switch 44, wiper motor 10 will start and coil 32 will be energized, causing drive pawl 36 to engage the smaller toothed wheel 38 and coil 29 will also pull lock arm 51 away from assembly 28, thereby freeing pawl 30 for movement. Coil 33 holds switch 43 closed until the circuit thereto is broken between leads 60 and 62. Wheel 38 will be drawn in a counterclockwise fashion by drive pawl 36 at a rate five times as fast as previously rotated in response to drive pawl 30. Cam switch 56 will remain engaged because coil 57 holds it as long as switch 44 is on.

The amount of movement allowed drive pawl 36 and the ratio of teeth on wheel 38 relative to cam assembly 28 will cause surface element 42 to break the bridge between elements 60 and 62 after three movements of pawl 36. At this time fifteen teeth of assembly 28 have been passed and the device reverts to the slow cycle. This results in coil 32 being deenergized, allowing drive pawl 36 to assume a free position out of engagement with tooth wheel 38. The washing cycle thereupon reverts to the normal cycle resulting in less water having been dispensed toward the windshield than dispensed utilizing the normal wash cycle. When assembly 28 completes one rotation lock arm 51 drops into assembly 28, preventing further washing as described in U.S. Patent 2,905,962.

The utility of the subject device is apparent in that under driving conditions when very light sediment collects on the windshield, much less water is needed to clean the windshield than when heavier sediment is deposited thereupon. The advantage is a saving of the dispensing fluid, as well as enabling a greater number of cycles between the filling of reservoir 22.

While the embodiment of the invention as herein disclosed constitutes a preferred form, it is to be understood that other forms might be adopted.

What is claimed is as follows:

1. A windshield washer system for intermittently delivering squirts of washing fluid onto a windshield of an automotive vehicle comprising: a washer pump having a reciprocable plunger means for intermittently supplying squirts of washing fluid under pressure onto the windshield; a drive means having an interruptible driving connection with said plunger means; and selectively operable control means for establishing a driving connection between said drive means and said plunger means to operate said pump and for interrupting the driving connection therebetween to terminate operation of the pump, said control means including first means operable to effect operation of the pump for a predetermined duration of time and second means operatively connected with the first means and operable to effect operation of said pump for a lesser duration of time.

2. A windshield washer system for intermittently delivering squirts of washing fluid onto a windshield of an automotive vehicle comprising: a washer pump having a reciprocable plunger means for intermittently supplying squirts of washing fluid under pressure onto the windshield; a drive means having an interruptible driving connection with said plunger means; selectively operable control means for establishing a driving connection between the drive means and the plunger means to operate said pump and which thereafter automatically interrupts the driving connection therebetween to terminate operation of the pump, said control means including a timer means which is engageable with said plunger means when in its normal position to hold the plunger means against movement, which allows the plunger means to be reciprocated when moved from its normal position and which reengages the plunger means to hold the latter against movement upon being moved a predetermined extent, a first means for moving the timer means through said predetermined extent at a first rate of speed and second means operatively connected with said first means for moving said timer means through said predetermined extent at a second faster rate of speed than said first means whereby said pump can be operated for different durations of time.

3. A windshield washer system as defined in claim 2 wherein said timer means is an indexable ratchet cam assembly having a pair of ratchet wheels, wherein said first means includes a lever which is pivotally supported at one end for movement in opposite directions about its pivot axis and a first pawl carried by said lever, said lever being reciprocable toward and from the ratchet cam assembly and with the first pawl being engageable with one of the ratchet wheels, means for normally preventing said first pawl from indexing said one ratchet wheel and means for moving said first pawl into operative engagement with said one ratchet wheel to enable that first pawl to index the ratchet wheel in response to its being reciprocated by said lever, wherein said second means includes a second pawl carried by said lever at a location spaced further from said pivot axis than said first pawl whereby said second pawl is moved a greater distance than said first pawl when the lever is reciprocated, said second pawl being normally spaced from the other ratchet wheel, means for moving said second pawl into engagement with said other ratchet wheel to index the ratchet cam assembly at a faster rate of speed.

4. A windshield washer system as defined in claim 3 wherein said ratchet wheels of said ratchet cam assembly are of different diameters and with the smaller diameter ratchet wheel being engageable by said second pawl.

References Cited

UNITED STATES PATENTS

| | | | |
|---|---|---|---|
| 2,905,962 | 9/1959 | Ziegler | 15—250.02 |
| 3,257,951 | 6/1966 | Espenschied et al. | 103—23 |

BILLY J. WILHITE, Primary Examiner

ROBERT T. SMITH, Assistant Examiner